United States Patent [19]

Hirooka et al.

[11] 4,355,693
[45] Oct. 26, 1982

[54] WORKING VEHICLE

[75] Inventors: Masami Hirooka, Sakai; Denzaburo Harada, Katano, both of Japan

[73] Assignee: Kubota Ltd., Japan

[21] Appl. No.: 206,449

[22] Filed: Nov. 13, 1980

[30] Foreign Application Priority Data

Sep. 29, 1980 [JP] Japan .......................... 55-139201[U]

[51] Int. Cl.³ ............................................ B62D 11/00
[52] U.S. Cl. .................................... 180/6.48; 60/484; 60/486
[58] Field of Search ...................... 180/6.48, 6.2, 6.66, 180/6.7; 60/484, 486

[56] References Cited

U.S. PATENT DOCUMENTS

| | | | |
|---|---|---|---|
| 3,782,488 | 1/1974 | Williamson | 180/6.48 |
| 3,916,767 | 11/1975 | Barton | 180/6.48 |
| 4,072,009 | 2/1978 | Daschievici et al. | 60/484 |
| 4,154,314 | 5/1979 | Tsuji et al. | 180/6.7 |

Primary Examiner—Joseph F. Peters, Jr.
Assistant Examiner—Ross Weaver
Attorney, Agent, or Firm—Kane, Dalsimer, Kane, Sullivan and Kurucz

[57] ABSTRACT

A working vehicle according to this invention comprises right and left traveling members (1a, 1b) adapted to be driven and stopped individually or simultaneously to effect traveling and turning round of the vehicle, a traveling speed changing mechanism (8) for providing a high speed drive and a low speed drive and including an operator member (8a), and a switch mechanism (13) adapted to automatically and reversibly switch the traveling speed changing mechanism (8) from a position to provide the high speed drive to a position to provide the low speed drive when the vehicle traveling straight turns round.

4 Claims, 6 Drawing Figures

WORKING VEHICLE

BACKGROUND OF THE INVENTION

(1) Field of the Invention

The present invention relates to a working vehicle having right and left traveling members adapted to be driven and stopped individually as well as simultaneously and a speed changing mechanism to switch the traveling members from high speed traveling to low speed traveling and vice versa.

(2) Description of the Prior Art

The working vehicle of the above construction is turned round by driving the right and left traveling members at different speeds, by driving one of them and stopping the other, or by driving them in opposite directions. When the vehicle runs straight, the speed changing mechanism is placed in a position to provide a high speed drive to attain high working efficiency. However, there is a danger of the vehicle turning over if it is turned round when running straight at high speed. Therefore, the speed changing mechanism is switched for the low speed drive at the time of turning round the vehicle, and is switched back to provide the high speed drive after the vehicle as been turned around. This makes for a very bad working efficiency and also there is a great possibility of forgetting to carry out the necessary switching operation for the low speed drive. This is because the turning round of the vehicle requires a two step operation; switching the speed changing mechanism from the high speed drive to the low speed drive and operating the right and left traveling members individually.

SUMMARY OF THE INVENTION

Having regard to the above noted state of the art, the object of the present invention is to eliminate the disadvantage of the known construction by means of a simple modification and to provide a simple and inexpensive construction therefor which does not easily get out of order.

To attain the above object, a working vehicle according to the present invention has right and left traveling members adapted to be driven and stopped simultaneously or individually to effect traveling and turning around of the vehicle, a traveling speed changing mechanism for providing a high speed drive and a low speed drive and including an operator member, and a switch mechanism adapted to automatically and reversibly switch the traveling speed changing mechanism from a position to provide the high speed drive to a position to provide the low speed drive when the vehicle traveling straight turns around, the switch mechanism comprising a high speed switching pedal operatively connected to the operator member of the speed changing mechanism, a resilient control mechanism operatively connecting the pedal to the operator member to permit the speed changing mechanism to move to the position to provide the low speed drive when the pedal has been operated for the high speed drive, a pivotable member operatively connected to the operator member, an oscillatable member connected to the pivotable member, right and left operator levers pivotable on axes aligned to one another and adapted to operate the pivotable member and the right and left traveling members individually, the operator levers being arranged parallel to one another and pivotable on the axes substantially parallel to a pivotal axis of the pivotable member, a pair of cam followers connected to the oscillatable member to be opposed to one another relative to the pivotal axes of the operator levers and adapted oscillatable respectively on axes substantially parallel to the axis of the pivotable member, and cam members connected to the right and left operator levers respectively and adapted to act on the cam followers to move the speed changing mechanism to the position to provide the low speed drive when the operator levers are oscillated relative to one another during high speed traveling of the vehicle and to move the speed changing mechanism to the position to provide the high speed drive when the operator levers are oscillated in the same direction.

Thus the invention enables the vehicle running straight at high speed to be turned round safely only by controlling the right and left traveling members since the speed changing mechanism automatically switches from the high speed position to the low speed position without having to go through the steps of operating to switch the speed changing mechanism for the low speed drive and thereafter to stop or reduce the speed of one of the right and left traveling members. When the vehicle has been turned round, the speed changing mechanism automatically returns to the high speed position only by operating the right and left traveling members as before. This arrangement prevents overturning of the vehicle due to a mishandling of the turning-round operation which could occur with the prior art construction and greatly facilitates the turning-round operation per se. Moreover, since the switch mechanism comprises the oscillating type cam followers and cams as its main components, the construction is simple and inexpensive and yet reliable.

Other objects and advantages of the invention will be apparent from the following description.

BRIEF DESCRIPTION OF THE DRAWINGS

The drawing illustrate a working vehicle according to the present invention, in which.

DETAILED DESCRIPTION OF THE PREFERRED EMBODIMENTS

Figure 1:
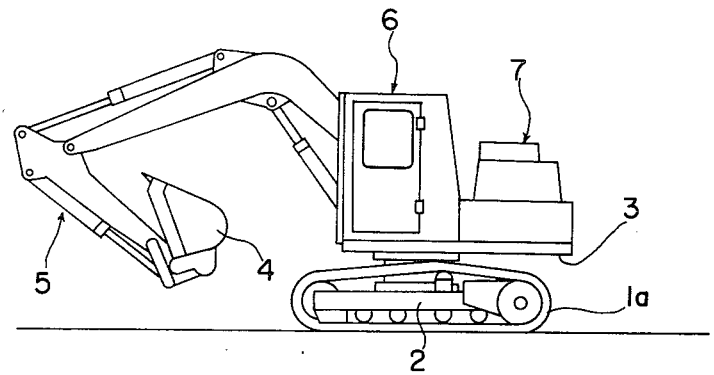
FIG. 1 is a side elevation of the working vehicle.

Referring to FIG. 1, an excavating vehicle comprises right and left crawler traveling members 1a and 1b attached to a vehicle base 2 on which a slewing platform 3 is mounted. The slewing platform 3 carries a working arm assembly 5 which is vertically oscillatable and flexible and has a bucket 5 at an extreme end thereof. The slewing platform 3 also carries an operator's cab 6 and a motor section 7.

Figure 2:
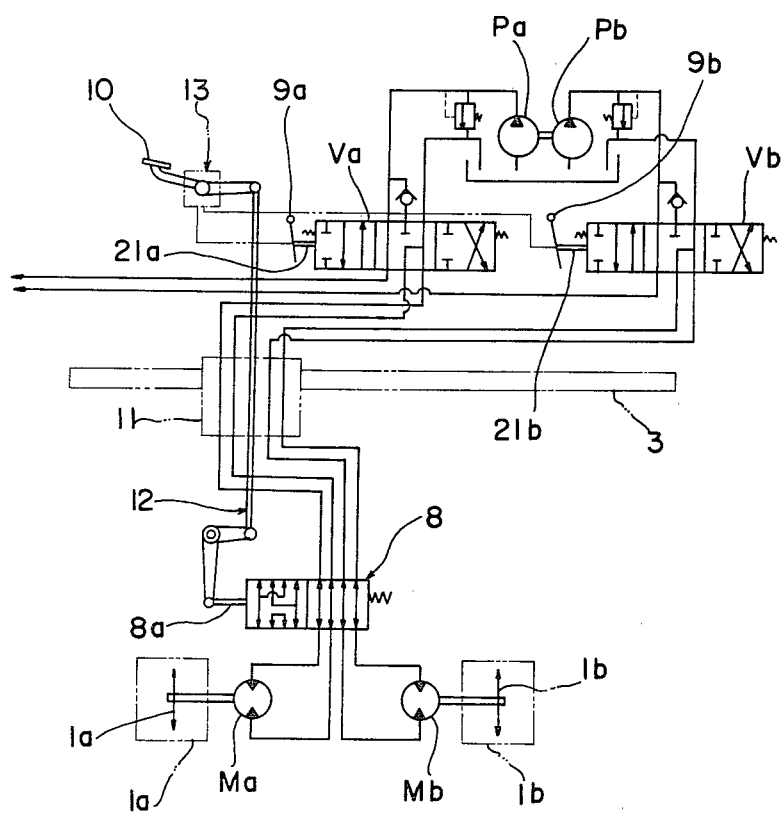
FIG. 2 is a diagram of a traveling drive system of the vehicle.

Referring to FIG. 2 showing a drive system for the right and left traveling members 1a and 1b, the traveling members 1a and 1b have drive wheels 1a and 1b connected to hydraulic motors Ma and Mb respectively which are driven by two pumps Pa and Pb. Control valves Va and Vb are provided on the slewing platform 3 to place the motors Ma and Mb respectively in forward, reverse and stop positions. A fluid passage switch valve 8 is provided on the vehicle base 2 to function as a traveling speed changing mechanism. This switch valve 8 is adapted to move between a position to provide a low speed drive by feeding pressure fluids from the pumps Pa and Pb to the motors Ma and Mb respectively and a position to provide a high speed drive by feeding the pressure fluids from the pumps Pa and Pb confluently and serially to the two motors Ma and Mb. Right and left operator levers 9a and 9b pivotable on axes X aligned to one another are operatively connected to the control valves Va and Vb through rods 21a and 21b, respectively. A high speed switching pedal 10 is operatively connected to an operator member 8a of the speed changing mechanism 8 through a link mechanism 12 extending through a rotary joint 11. This arrangement includes a switch mechanism 13 adapted, when the vehicle is turned round with the speed changing mechanism 8 in the high speed position, to automatically and reversibly move the speed changing mechanism 8 from the high speed position to the low speed position.

Figure 3:
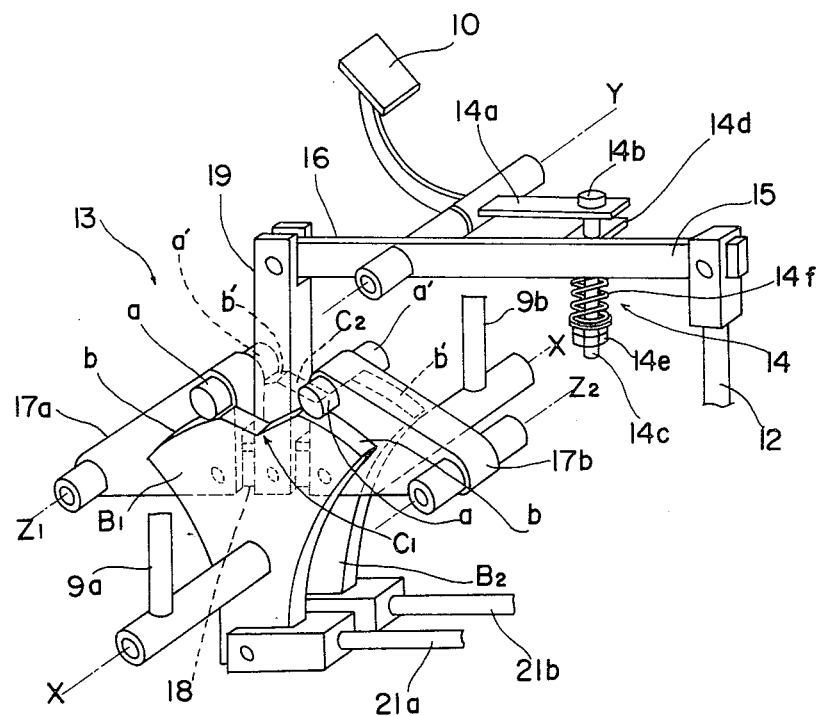
FIG. 3 is a perspective view of a switch mechanism.

As shown in FIG. 3, the switch mechanism 13 comprises a resilient control mechanism 14 connected to the link mechanism 12 and adapted to permit the speed changing mechanism 8 (FIG. 2) to move to the low speed position while the pedal 10 has been operated to provide the high speed. A pivotable member 15 operatively connected to the operator member 8a of the speed changing mechanism 8 (FIG. 2) is attached to an axis aligned to an axis Y on which the pedal 10 pivots and which axes are substantially parallel to the pivotal axes of the operator levers 9a and 9b. An oscillatable member 16 is provided integral with the pivotable member 15.

The resilient control mechanism 14 comprises an arm 14a connected to the pedal 10, rod 14c provided with a stopper 14b and loosely fitted into a hole defined at a free end of the arm 14a, a connecting piece 14d penetrated at one end thereof by the rod 14c and securely attached at the other end to a lateral position of the pivotable member 15, and a compression spring 14f mounted between the connecting piece 14d and a nut 14e attached to an end of the rod 14c opposite to the end thereof carrying the stopper 14b. The stopper 14b and the connecting piece 14d are spaced away from one another to allow for a free play in operation.

Triangular members 17a and 17b are disposed opposite one another relative to the pivotal axes X of the operator levers 9a and 9b. The triangular members 17a and 17b are oscillatable on axes $Z_1$ and $Z_2$ substantially parallel to the pivotal axes X of the operator levers 9a and 9b. The triangular members 17a and 17b are pivoted to a link 18 which is pivotally connected through a push pull rod 19 to the oscillatable member 16. Cam followers a and a' are provided on both lateral sides of tops of the triangular members 17a and 17b in a manner opposed to one another relative to the pivotal axes X of the operator levers 9a and 9b.

The right and left operator levers 9a and 9b are provided with cam plates B1 and B2, respectively, each of the cam plates B1 and B2 having one recess C1 and two cams b which together form an approximately inverted W-shape camming surface. When the operator levers 9a and 9b are in neutral positions, the cam paltes B1 and B2 are adapted to contact the cam followers a and a' respectively to check movement of the speed changing mechanism 8 to the high speed position, notwithstanding the pedal 10 having been operated to provide the high speed. When the operator levers 9a and 9b in the neutral positions are oscillated in the same direction, the cam plates B1 and B2 then permit the speed changing mechanism 8 to move to the high speed position. When the operator levers 9a and 9b are oscillated relative to one another during high speed traveling of the vehicle to turn round the vehicle, the cam plates B1 and B2 cause the speed changing mechanism 8 to move to the low speed position, and then, when the levers 9a and 9b are oscillated in the same direction to drive the vehicle straight after it has been turned round, the speed changing mechanism 8 returns to the high speed position.

Figure 4:
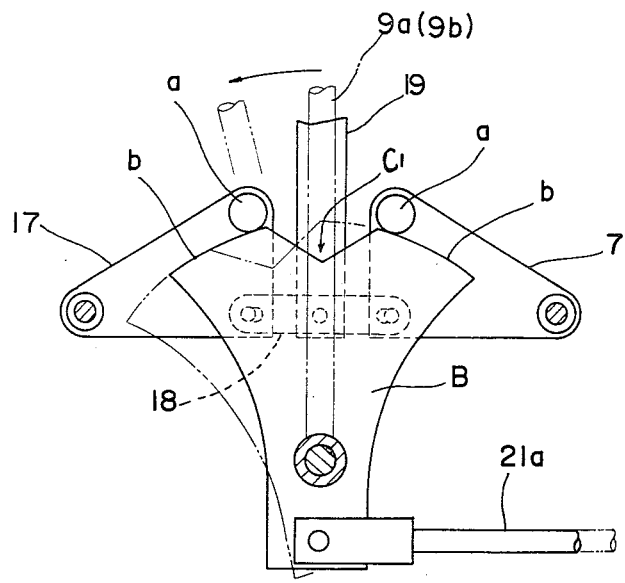
FIG. 4 is an enlarged side view of a principal part of the switch mechanism showing one operative position of the switch mechanism.

How the switching mechanism 13 operates is now described with reference to FIGS. 3 through 5. When the switch mechanism 13 is in a position indicated by solid lines in FIG. 4, the right and left operator levers 9a and 9b for placing the hydraulic motors Ma and Mb in forward, reverse and stop positions are in the neutral positions, that is the hydraulic motors Ma and Mb are in the stop positions. When the switch mechanism 13 is in a position indicated by phantom lines in FIG. 4, the right and left levers 9a and 9b are both in the forward positions. Now, the pedal 10 is depressed while the right and left levers 9a and 9b are in the neutral positions. This imparts a force by way of the control mechanism 14 to oscillate the link mechanism 12 connected to the traveling speed changing mechanism or fluid passage switching valve 8 about the axis Y, but the cam followers a operatively connected to the link mechanism 12 are engaged by the cams b as shown in FIG. 4 to render immovable the pivotable member 15 connected to the link mechanism 12. Therefore, the depression of the pedal 10 results only in compression of the compression spring 14f of the resilient control mechanism 14.

Figure 5:
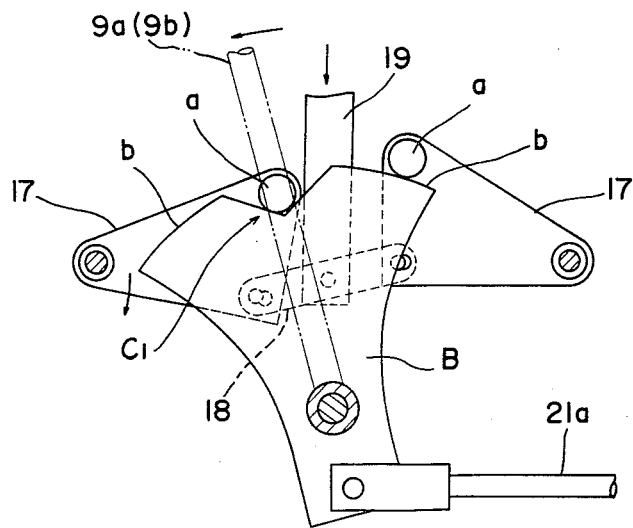
FIG. 5 is an enlarged side view of the principal part of the switch mechanism showing another operative position of the switch mechanism.

However, when the operator levers 9a and 9b are simultaneously oscillated into the position (for forward traveling, for example) indicated by the phantom lines in FIG. 4, with the pedal 10 depressed as described above, the cam followers a urged against the cams b by the compression spring 14f oscillate the cam plates B1 and B2 and fit into the recesses C1 and C2, thereby drawing the push pull rod 19 downwardly via the link 18 to assume a position as shown in FIG. 5. The downward movement of the rod 19 moves the link mechanism 12 through the oscillatable member 16 and the pivotable member 15 integral with one another (FIG. 3). Thereby the fluid passage switching valve or traveling speed changing mechanism 8 operatively connected to the link mechanism 12 is automatically switched to connect the hydraulic motors Ma and Mb in series, whereupon the vehicle runs at high speed.

To turn round the vehicle with the pedal 10 kept depressed, one of the right and left operator levers 9a and 9b, for example the lever 9a, is oscillated into the neutral position to stop the corresponding hydraulic motor Ma. Then the cam plate B1 rigidly connected to this lever 9a oscillates from the position in FIG. 5 to push up the cam follower a by virtue of a camming action of the recess C1 and thereby to lift the push pull rod 19 operatively connected to the cam follower a. This operates the fluid passage switching valve or traveling speed changing mechanism 8 through the link mechanism 12 to automatically return the hydraulic motors Ma and Mb to the parallel connection. At this time the compression spring 14f is compressed again.

Since the other operator lever 9b is retained in the forward position, the pressure fluid flows only to the hydraulic motor Mb associated with the lever 9b, whereby the vehicle turns about the traveling member 1a connected to the hydraulic motor Ma standing still. When the operator lever 9a is returned from the neutral position to the forward position upon completion of turning of the vehicle, the speed changing mechanism 8 automatically returns to the high speed position by virtue of the restoring force of the compression spring 14f which has been kept compressed. Thus, so long as the pedal 10 is kept depressed, the vehicle traveling at high speed automatically slows down for turning round merely by operating the operator levers 9a and 9b for controlling the right and left traveling members 1a and 1b. Similarly the vehicle automatically resumes the high speed traveling only by operating the levers 9a and 9b back to the previous positions after the turning of the vehicle.

It will be understood from the foregoing description of operation that the right and left traveling members 1a and 1b may be driven at slightly different relative speeds by operating the levers 9a and 9b. Also the vehicle may make a speed turning by operating the levers 9a and 9b in opposite directions, namely one in the forward direction and the other in the backward direction. Furthermore, the vehicle may be turned round as desired with the automatic and reversible slowing down function also when the vehicle is traveling backward.

Figure 6:
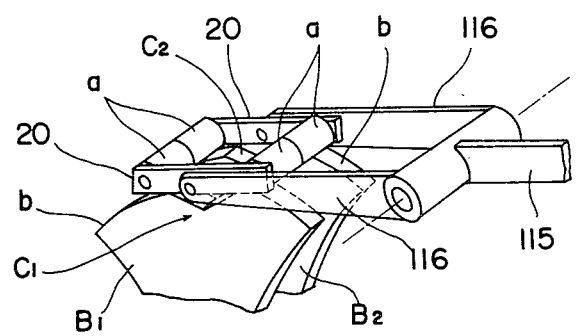
FIG. 6 is a perspective view of a modified cam follower attaching structure.

FIG. 6 shows a modified attaching structure for the cam followers, in which oscillatable members 116 are arranged parallel with and spaced away from one another in the axial direction of a pivotable member 115 which corresponds to the pivotable member 15. Pivotable members 20 are attached to ends of the oscillatable members 116, and cam followers a of the roller type are mounted between opposed ends of the pivotable members 20. The cam follows a are opposed to one another relative to the pivotal axes of the operator levers 9a and 9b.

While the fluid passage switching valve has been described as an example of the traveling speed changing mechanism 8, it will be appreciated that other types of speed changing mechanism than the hydraulically operable mechanism may be employed if only operable by the high speed switching pedal 10.

It is to be noted that this invention is applicable to varied types of working vehicle including those for civil engineering, transportation, agriculture and so on.

We claim:

1. In a working vehicle having right and left traveling means (1a, 1b) adapted to be driven and stopped simultaneously or individually to effect traveling and turning round of the vehicle, traveling speed changing means (8) for providing a high speed drive and a low speed drive and including an operator member (8a), and switch means (13) adapted to automatically and reversibly switch the traveling speed changing means (8) from a position to provide the high speed drive to a position to provide the low speed drive when the vehicle traveling straight turns round, said switch means (10) comprising, a high speed switching panel (10) operatively connected to said operator member (8a) of said speed changing means (8), resilient control means (14) operatively connecting said pedal (10) to said operator member (8a) to permit said speed changing means (8) to move to the position to provide the low speed drive when said pedal (10) has been operated for the high speed drive, a pivotable member having first and second ends and being pivotable on an axis intermediate and first and second ends, said pivotable member (15) being operatively connected to said operator member (8a) at said first end, right and left operator levers (9a, 9b) pivotable on axes aligned to one another and adapted to operate said pivotable member (15) and said right and left traveling means (1a, 1b) individually, said operator levers being arranged parallel to one another and pivotable on the axes substantially parallel to the pivotal axis (Y) of said pivotable member (15), a pair of cam follower means (a, a') connected to said second end of said pivotable member (16) to be opposed to one another relative to said pivotal axes (X) of said operator levers (9a, 9b) and adapted to be oscillatable respectively on axes (Z1, Z2) substantially parallel to the axis (Y) of said pivotable member (15), and cam means (b, b') connected to said right and left operator levers (9a, 9b) respectively and adapted to act on said cam follower means (a, a') to move said speed changing means (8) to the position to provide the low speed drive when said operator levers (9a, 9b) are oscillated relative to one another during high speed running of the vehicle and to move said speed changing means (8) to the position to provide the high speed drive when said operator levers (9a, 9b) are oscillated in the same direction.

2. A working vehicle as claimed in claim 1 wherein said cam means (b) comprises two cam plates (B1, B2) connected to said right and left operator levers (9a, 9b) to be oscillatable on said pivotal axes (X) of said right and left operator levers (9a, 9b), and said cam follower means (a, a') comprises two triangular members (17a, 17b) pivotable on said pivotal axes (Z1, Z2) a push pull rod and a link (18) pivotally connecting said triangular members (17a, 17b) to said push pull rod (19).

3. A working vehicle as claimed in claim 2 wherein each of said cam means (b, b') has in side view an approximately inverted W-shaped camming surface.

4. A working vehicle as claimed in claim 1 or 3 further comprising two pumps (Pa, Pb) for driving said right and left traveling means (1a, 1b), two hydraulic motors (Ma, Mb) driven by fluid pressures provided by said pumps (Pa, Pb) and operatively connected to said right and left traveling means (1a, 1b), and a hydraulic circuitry therefor, wherein said hydraulic motors (Ma, Mb) are adapted to be switched, by said switch means (13) through said traveling speed changing means (8), between a parallel connection with one another relative to said pumps (Pa, Pb) to provide the low speed drive and a series connection with one another relative to said pumps (Pa, Pb) to provide the high speed drive.

* * * * *